Dec. 23, 1947. A. J. BRENT 2,433,261
PROCESS FOR MAKING ALL PLASTIC ARTIFICIAL EYES AND PRODUCT THEREOF
Filed Aug. 1, 1946
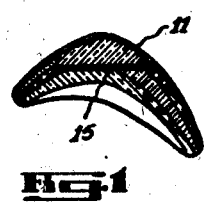
Fig.1
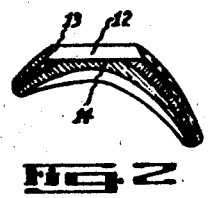
Fig.2
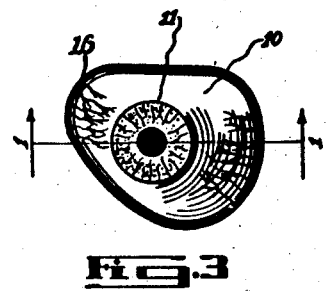
Fig.3
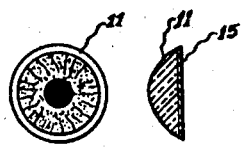 
Fig.4  Fig.4a
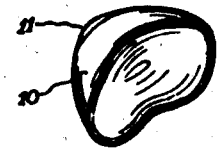
Fig.5
INVENTOR
ALFRED JOHN BRENT
C. Harold Riches
ATTORNEY Patented Dec. 23, 1947

2,433,261

UNITED STATES PATENT OFFICE 2,433,261

PROCESS FOR MAKING ALL PLASTIC ARTIFICIAL EYES AND PRODUCT THEREOF

Alfred John Brent, Toronto, Ontario, Canada

Application August 1, 1946, Serial No. 687,598
In Canada March 27, 1946

5 Claims. (Cl. 3—13)

This invention relates to a method of making artificial eyes and artificial eyes produced thereby. The invention is particularly directed to the manufacture of artificial eyes in which the sclera is formed of thermoplastic material and the iris is blended into the sclera in a manner which eliminates the staring effect heretofore considered impossible to attain in eyes formed of thermoplastic material.

Processes for the manufacture of artificial eyes are relatively well known and are widely used. The processes of the prior art involve generally the employment of glass on which is painted, by well known methods, the representation of an iris. In this process, the blending of the iris into the sclera does not involve any particular difficulty, and the staring effect of an artificial eye formed of glass is not noticeable. However, the manufacture of natural appearing eyes has been relatively costly.

More recently, the possibility of manufacturing artificial eyes of thermoplastic material has been explored, but a difficulty is present in the finished product of such a process which heretofore has not been possible to overcome, and that is that it is not possible to impart to the artificial eye, a blending of the edge of the iris into the sclera, with the result that such eyes, when worn by a patient, have a staring, unnatural appearance. Also, the thermoplastic eyes of the prior art have the difficulty that it has not been possible to obtain an absorption of light of various degrees of density, with the result that the eye tends to reflect light rather than to absorb it. In an endeavour to avoid this difficulty, a further difficulty is encountered in that the eye tends to absorb all the light, with the result that it has a dark and gray appearance.

One of the objects of this invention is to provide an artificial eye in which the sclera is formed of layers of thermoplastic material of a blending of light absorption and reflection properties, whereby the sclera can be produced in a form which presents a perfectly natural appearance.

A further important object of the invention is to provide an artificial eye formed of thermoplastic material whereby the edge of the iris is blended into the sclera in such a manner as to present a natural appearance, and the unnatural staring appearance of the eye is eliminated.

The artificial eye of the present invention comprises a sclera formed of layers of thermoplastic material, the base layer being opaque, and the layers from the base to the front being of progressively increasing translucency, a socket in the sclera between the base and the front layers, an iris fitted into said socket with the periphery welded therein by the outermost translucent layers, and a transparent layer overlying said iris.

The invention further contemplates a method of making artificial eyes which comprises preparing thermoplastic materials to produce layers of material of degrees of translucency varying from the opaque to the transparent, moulding the sclera in layers of translucent material with the opaque layer in the base and the subsequent layers of progressively increasing translucency, forming a socket in the sclera, inserting an iris in the socket, welding the periphery of the iris in place with layers of the translucent material, and overlying the iris with a layer of transparent material.

An understanding of the manner in which the above and other objects of the invention are attained may be had from the following description, reference being made to the accompanying drawings in which:

Figure 1 is a cross sectional side elevation of an artificial eye constructed in accordance with the method of the present invention taken along the line 1—1, Figure 3;

Figure 2 is a cross sectional side elevation of the sclera;

Figure 3 is a top plan view;

Figure 4 is a top plan view of the iris;

Figure 4a is a cross sectional side elevation of the iris; and

Figure 5 is a side elevation of the eye partly in perspective to illustrate the configuration of the base.

Like reference characters refer to like parts throughout the specification and drawings.

The artificial eye illustrated in the drawings comprises a body or sclera 10 and an iris 11.

The sclera is moulded in layers of resinous material, the layers being of varying degrees of translucency. The base layer 20 is substantially opaque and the superimposed layers, from the back to the front, being of progressively increasing translucency. There are a number of thermoplastic materials of which the sclera may be formed, such as one or other of the acetate compounds, but it is preferred to use methyl methacrylate which is colourless and which may be coloured very easily by the addition of conventional colouring ingredients prior to moulding, and which possesses light absorption and reflection properties which are highly desirable in artificial eyes.

The individual layers forming the sclera are prepared by mixing with the methyl methacrylate the colouring matter necessary to provide the desired degree of translucency. For example, the layer to be employed as the base or back layer, is coloured so as to be substantially opaque, and the overlying layers progressively less opaque and progressively more translucent, with the front layer or layers substantially transparent.

The layers are built up on a form to provide the desired configuration of the eye, the body of the eye being more or less hollow to seat lightly in the eye socket.

Veins 16 are applied to the front of the scleral portion either by employing suitably coloured silk or silk-like threads or, preferably, by engraving the pattern of the veins in the front surface of the scleral portion and tinting the engraved patterns with suitable colouring media.

A socket 12 is formed in the front of the sclera. This socket is formed with a plane base 14, and side walls 13 which diverge slightly away from each other from the front towards the back of the sclera. The socket is of a depth of at least part of one layer of translucent sclera and is preferably slightly deeper.

The iris is preferably formed of two parts moulded together, a rounded button shaped portion of transparent material with a plane base, and a substantially circular coloured base portion 15. The base 15 may be formed of coloured paper or other suitable material according to conventional practice to simulate a natural iris and is designed to match the natural eye of the patient. These two parts are moulded together to form an integral piece, the base of which is fitted into the base of the socket 12 wherein it lies flat on the plane surface 14. The curved, button shaped part is substantially transparent and is seated in the socket with the plane base fitted snugly therein against the base 14 and between the diverging walls 13. The iris is then covered with an overlying layer of substantially transparent material, and the structure is ready for moulding.

The sclera and iris are moulded under the influence of heat and pressure, the moulding operation fusing the layers together in such a manner as to form an integral structure in which the light absorption and reflection properties of the respective layers are blended together without any noticeable lines of demarcation, and the edge of the base of the iris is fused in place by translucent material which forms the wall of the socket. In using methyl methacrylate, the moulding operation is effected at a temperature at about 212° F.

The method of making artificial eyes of the present invention has a number of important advantages. By building up the sclera in layers, it is possible to reproduce substantially exactly the appearance of the natural eye of the patient. Also, it is possible to obtain a finished product which possesses light absorption and reflection properties which impart a perfectly natural appearance. Also, in mounting the iris in a socket formed in the body of the sclera, the edge of the socket overlaps to a certain extent, the edge of the iris to cause a blending of the edge of the base of the iris into the sclera which eliminates any staring effect common in artificial eyes of the prior art.

It will be understood of course, that modifications may be made in the preferred embodiment of the invention described and illustrated herein without departing from the scope of the invention as defined by the appended claims.

What I claim as new and desire to protect by Letters Patent of the United States is:

1. An artificial eye formed in layers of thermoplastic material, the base layer being opaque and the layers from the base to the front being progressively increasingly translucent, the front layer being substantially transparent, a socket in the sclera between the base and the front layers, and an iris having its base welded in said socket by translucent material, said transparent layer overlying said iris.

2. An artificial eye formed in layers of thermoplastic material, the base layer being opaque and the layers from the base to the front being progressively increasingly translucent, the front layer being substantially transparent, a socket moulded in the sclera between the back and front layers, an iris seated in said socket, with translucent material overlying the edge of the base of the iris and the transparent layer overlying said iris and welding it in place.

3. A method of making artificial eyes which comprises preparing thermoplastic material to produce layers of material of degrees of translucency varying from the opaque to the transparent, moulding the sclera of the eye in layers of said material with the opaque layer in the base and subsequent layers progressively increasingly translucent, forming a socket in the sclera, inserting an iris in the socket, and welding the iris in place with translucent material and overlying the iris with a layer of transparent material.

4. A method of making artificial eyes which comprises preparing thermoplastic material to produce layers of material of degrees of translucency varying from the opaque to the transparent, building the sclera of the eye in layers of said material with the opaque layer in the base and subsequent layers progressively increasingly translucent, forming a socket in the sclera, inserting an iris into the socket with translucent material overlying the base edge of the iris, overlying the iris with a layer of transparent material, and moulding the iris and layers into an integral structure under the influence of heat and pressure.

5. An artificial eye formed in layers of thermoplastic material, the base layer being opaque, and the layers from the base to the front being increasingly translucent, the front layer being substantially transparent, a socket in the sclera between the base and the front layers, an iris having its base welded in said socket by translucent material, a transparent layer overlying said iris, and tinted vein patterns engraved in the front of the sclera below said transparent layer.

ALFRED JOHN BRENT.

REFERENCES CITED

The following references are of record in the file of this patent:

UNITED STATES PATENTS

| Number | Name | Date |
|---|---|---|
| Re. 22,331 | Myerson | June 8, 1943 |
| 1,253,888 | Rosser | Jan. 15, 1918 |
| 1,268,885 | Sampson | June 11, 1918 |
| 1,763,312 | Marcus | June 10, 1930 |
| 2,391,305 | Galeski | Dec. 18, 1945 |
| 2,394,400 | Noles | Feb. 5, 1946 |

OTHER REFERENCES

"Making plastic artificial eyes," J. H. Prince from the Optician, Feb. 16, 1945, pp. 37-40.